US012682218B2

(12) United States Patent
Kuzdeba et al.

(10) Patent No.: US 12,682,218 B2
(45) Date of Patent: Jul. 14, 2026

(54) METHOD FOR SIGNAL REPRESENTATION AND CONSTRUCTION

(71) Applicant: BAE SYSTEMS Information and Electronic Systems Integration Inc., Nashua, NH (US)

(72) Inventors: Scott A Kuzdeba, Hollis, NH (US); Joseph M. Carmack, Milford, NH (US); James M. Stankowicz, Jr., Boston, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1027 days.

(21) Appl. No.: 17/358,153

(22) Filed: Jun. 25, 2021

(65) Prior Publication Data

US 2023/0130863 A1     Apr. 27, 2023

(51) Int. Cl.
*G06N 3/0464* (2023.01)
*G06N 3/063* (2023.01)

(52) U.S. Cl.
CPC ........... *G06N 3/0464* (2023.01); *G06N 3/063* (2013.01)

(58) Field of Classification Search
CPC ....... G06N 3/0464; G06N 3/063; G06N 3/045
See application file for complete search history.

(56) References Cited

U.S. PATENT DOCUMENTS

| 2016/0073111 A1* | 3/2016 | Lee | H04N 19/124 |
| | | | 375/240.03 |
| 2019/0066713 A1* | 2/2019 | Mesgarani | G10L 25/30 |

| 2019/0356520 A1 | 11/2019 | Silverman | |
| 2020/0007633 A1 | 1/2020 | Kim | |
| 2020/0034948 A1* | 1/2020 | Park | G06N 3/088 |
| 2020/0051583 A1* | 2/2020 | Wu | G10L 13/047 |

(Continued)

FOREIGN PATENT DOCUMENTS

| CN | 110012428 A | * | 7/2019 | ........... H04W 4/021 |

OTHER PUBLICATIONS

Sankhe, K., Belgiovine, M., Zhou, F., Riyaz, S., Ioannidis, S., Chowdhury, K., "Oracle: Optimized Radio clAssification through Convolutional neuraL nEtworks," IEEE Infocom 2019—IEEE Conference on Computer Communications, pp. 370-378, Apr. 2019 (Year: 2019).*

(Continued)

*Primary Examiner* — Omar F Fernandez Rivas
*Assistant Examiner* — Shamcy Alghazzy
(74) *Attorney, Agent, or Firm* — Maine Cernota & Curran

(57) ABSTRACT

A Deep-Learning (DL) system for representation and construction or reconstruction of signals includes an encoder stage; an encoding; an optional modification stage; a decoder stage, and a (re)construction stage. The encoder stage includes layers of dilated convolutions, and the encoder maps from an input representation into a latent embedded representation. It learns a set of features that encode the input signals. The encoding stage comprises latent space; the decoder stage maps from latent features back to an output of the same size as the input signals, whereby the output has the same dimensionality and representation as the input signals. Modification to the signal can be conducted within the latent representation to alter the (re)construction for specific tasks, such as increasing a device's RF fingerprint.

9 Claims, 9 Drawing Sheets

DIMENSIONAL REPRESENTATION WITHIN SR-DCC

(56) References Cited

U.S. PATENT DOCUMENTS

| | | | |
|---|---|---|---|
| 2020/0104679 A1* | 4/2020 | van den Oord | G06N 3/048 |
| 2020/0162328 A1 | 5/2020 | Valenza | |
| 2021/0048507 A1 | 2/2021 | Kuzdeba et al. | |
| 2021/0193259 A1* | 6/2021 | Bikard | G16B 20/20 |

OTHER PUBLICATIONS

Zhang, X., You, J., "A Gated Dilated Causal Convolution Based Encoder-Decoder for Network Traffic Forecasting," IEEE Access, vol. 8, pp. 6087-6097, Jan. 2020 (Year: 2020).*

Du—Brain_MRI_Super-Resolution_Using_3D_Dilated_Convolutional_EncoderDecoder_Network (Year: 2019).*

Gao—A_Multi-Scale_Fully_Convolutional_Network_for_Singing_Melody_Extraction (Year: 2019).*

J. Robinson, S. Kuzdeba, J. Stankowicz and J. M. Carmack, "Dilated Causal Convolutional Model For RF Fingerprinting," 2020 10th Annual Computing and Communication Workshop and Conference (CCWC), Las Vegas, NV, USA, 2020, pp. 0157-0162, doi: 10.1109/CCWC47524.2020.9031257. Presented on Jan. 6, 2020.

J. Robinson and S. Kuzdeba, "RiftNet: Radio Frequency Classification for Large Populations," IEEE Consumer Communications & Networking Conference (CCNC), Las Vegas, NV, USA, 2021. Presented on Jan. 10, 2021.

J. Robinson and S. Kuzdeba, "Novel device detection using RF fingerprints," 2021 11th Annual Computing and Communication Workshop and Conference (CCWC), Las Vegas, NV, USA, 2021. Presented on Jan. 28, 2021.

S. Kuzdeba, J. Robinson and J. Carmack, "Transfer Learning with Radio Frequency Signals," 3rd International Workshop on Security Trust and Privacy for Emerging Cyber Physical Systems (STP-CPS'21) as part of IEEE Consumer Communications & Networking Conference (CCNC), Las Vegas, NV, USA, 2021. Presented on Jan. 12, 2021.

J. Stankowicz and S. Kuzdeba, "Unsupervised Emitter Clustering through Deep Manifold Learning," 2021 11th Annual Computing and Communication Workshop and Conference (CCWC), Las Vegas, NV, USA, 2021. Presented on Jan. 28, 2021.

Oord, Aaron Van Den, et al. "WaveNet: A Generative Model for Raw Audio", Google DeepMind, London, UK. Sep. 19, 2016.

J. M. Carmack and S. Kuzdeba, "RiftNet Reconstruction Model for Radio Frequency Domain Waveform Representation and Synthesis," Conf. May 10-13, 2021; Pub. Jun. 21, 2021, 2021 IEEE World AI IoT Congress (AIIoT), 2021, pp. 0303-0312, doi: 10.1109/AIIoT52608.2021.9454242.

Notice of Allowance for U.S. Appl. No. 17/142,800 mail date Nov. 16, 2022, 23 pages.

Office Action for U.S. Appl. No. 17/503,205 mail date Jan. 28, 2025, 59 pages.

Ding, Lida et al. "Specific Emitter Identification via Convolutional Neural Networks" 2018 [Online] Downloaded Jan. 23, 2025 https://ieeexplore.ieee.org/stamp/stamp.jsp?tp=&arnumber=8469100 (Year: 2018) 4 pages.

Zien, Alexander et al. "The Feature Importance Ranking Measure" 2018 [Online] Downloaded Jan. 23, 2025 (Year: 2018) 15 pages.

Newport, Robert. "Radar Emitter Recognition Using Hierarchical Feature Extraction within Magnitude and Frequency Domains" 2019 [Online] Downloaded Jan. 23, 2025 from https://scholar.google.com/citations?user=TWC3FrYAAAAJ&hl=en&oi=sra (Year: 2019) 76 pages.

* cited by examiner

DIMENSIONAL REPRESENTATION WITHIN SR-DCC

200

TRAINING

DCC CLASSIFIER USED AS BASE MODEL FOR SR-DCC WAVEFORM
SYNTHESIS

400

Real part or Magnitude 410

405
Complex
data

Imaginary part or Phase 415

Causal Padding 425

420

DCC Filter with
kernel size 3

Convolve

1D
Feature
Map or
scalar
rep.

Two channels

DCC CONVOLUTION OPERATION PRODUCING 1D FEATURE MAP

500

Real part or Magnitude 510

505
Complex
data

Imaginary part or Phase 515

SDCC Filter
1st half
with kernel
size 3

525

SDCC Filter
2nd half
with kernel
size 3

2D Feature Map 530
(i.e. 2D vector representation)

SIGNAL DCC CONVOLUTION OPERATION PRODUCING 2D FEATURE MAP

600

615

605

610

2 CHANNEL SIGNAL DCC CONVOLUTION OPERATION

700

OPERATORS FOR MAKING FEATURE MAP MODIFICATIONS

800

ACTIONS APPLIED TO DIMENSIONAL REPRESENTATION
WITHIN SIGNAL RECONSTRUCTION DILATED CASUAL CONVOLUTIONS (SR-
DCC) MODEL

900

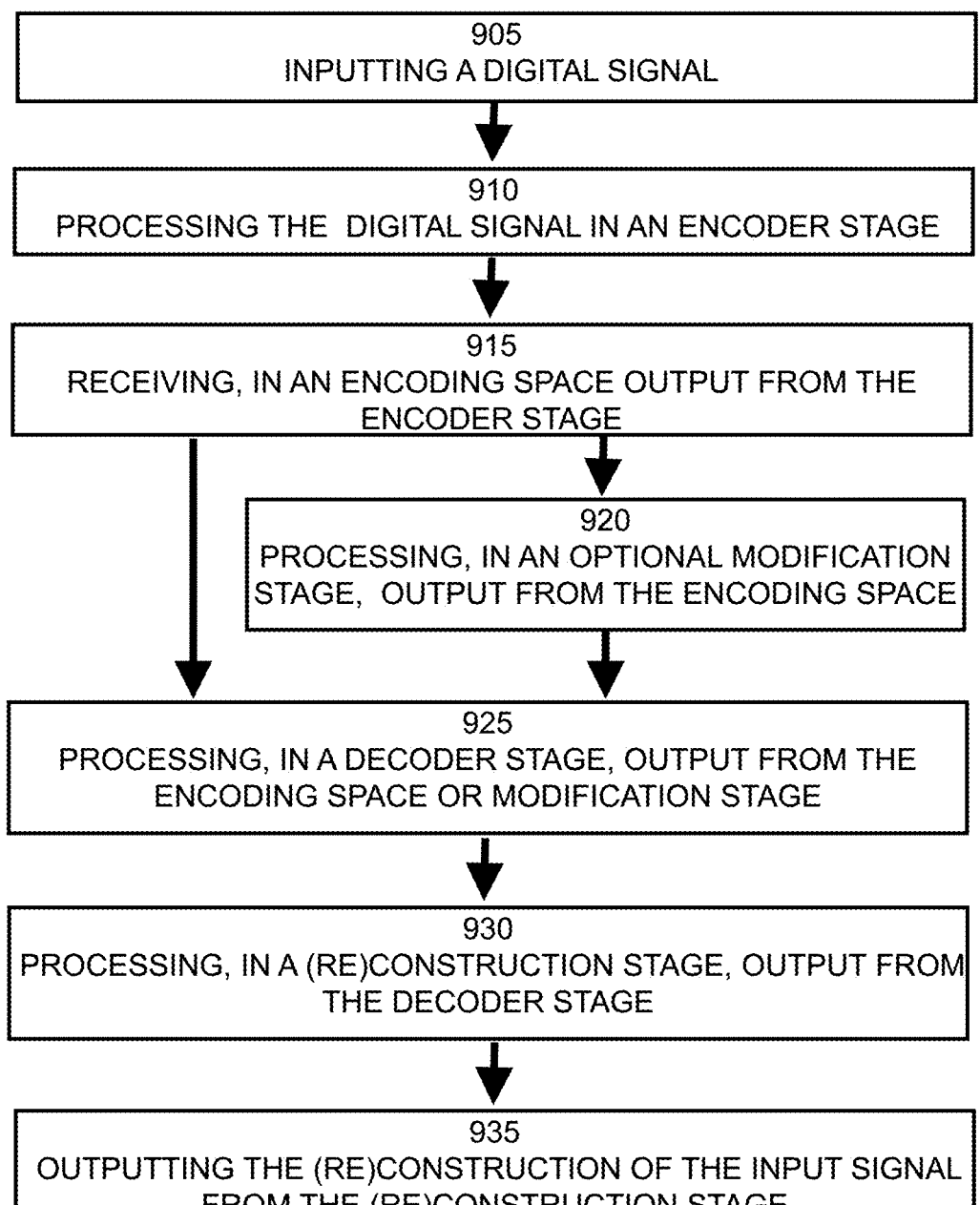

905
INPUTTING A DIGITAL SIGNAL

910
PROCESSING THE DIGITAL SIGNAL IN AN ENCODER STAGE

915
RECEIVING, IN AN ENCODING SPACE OUTPUT FROM THE ENCODER STAGE

920
PROCESSING, IN AN OPTIONAL MODIFICATION STAGE, OUTPUT FROM THE ENCODING SPACE

925
PROCESSING, IN A DECODER STAGE, OUTPUT FROM THE ENCODING SPACE OR MODIFICATION STAGE

930
PROCESSING, IN A (RE)CONSTRUCTION STAGE, OUTPUT FROM THE DECODER STAGE

935
OUTPUTTING THE (RE)CONSTRUCTION OF THE INPUT SIGNAL FROM THE (RE)CONSTRUCTION STAGE

METHOD
FIG. 9

METHOD FOR SIGNAL REPRESENTATION AND CONSTRUCTION

STATEMENT OF GOVERNMENT INTEREST

Portions of this invention have been made with government support under Contract Number FA8750-18-C-0150 awarded by the U.S. Air Force. The United States Government has certain rights in the inventions.

FIELD

The following disclosure relates generally to signal processing and, more particularly, to taking a communications signal to an alternative representation. A new signal can then be constructed from that alternative representation. Additionally, an original signal can be put into the alternative representation and then be reconstructed from it, optionally with additional modifications to the signal to enhance unique characteristics of the signal before reconstructing it.

BACKGROUND

Waveform modeling and synthesis in the Radio Frequency (RF) domain has been dominated for years by traditional digital signal processing (DSP) techniques which rely on well understood mathematical theories such as Fourier and Wavelet theory. These techniques model all waveforms as a composition of basis functions, i.e., harmonics or wavelets. For discrete data, such as complex-valued in-phase, I, and quadrature, Q, common to the RF domain, these waveform representations are facilitated by the Discrete Fourier Transform (DFT) or Discrete Wavelet Transform (DWT). Once in these representations, waveforms can be easily modified and then re-synthesized for a specific task. Although these waveform representations are efficient, broadly applicable, and well understood, they often result in a large waveform modification space that is difficult to constrain or adapt to a target domain and task. Hence the requirement for highly specialized expertise in the realm of waveform engineering.

One particularly challenging problem in the RF communications domain is waveform modeling and synthesis within the constraints of a particular wireless communications protocol at scale. Communications waveforms are typically highly optimized to maximize information transmission rate while minimizing energy footprint, and thus place rigid standards on waveforms that can be used within the communications system. Additionally, new methods are being explored to simultaneously enhance waveform identifiability and security by detecting the transmitter's RF fingerprint imparted on its communications waveform upon transmission. For this application, any modifications made to the communication waveform in an attempt to enhance identification must maintain compliance with protocol standards.

Existing solutions take several forms. A first methodology leverages expert knowledge of the domain space. Functional decomposition methods such as Fourier transforms, wavelet transforms, and the like, explicitly decompose a signal into linear combinations of basis functions. The signal can then be reconstructed by combining the individual basis functions with the learned linear weight. A second methodology is to compress the input signal into a lower dimensional representation, where it can then be reconstructed to its full resolution. This is typically done through explicit compression algorithms or with emerging techniques such as autoencoders. U.S. patent application Ser. No. 16/539,578 RF FINGERPRINT ENHANCEMENT BY MANIPULATION OF AN ABSTRACTED DIGITAL SIGNAL filed Aug. 13, 2019 describes abstracting and compressing RF transmissions to detect RF fingerprints; this application is incorporated, by reference, in its entirety, for all purposes.

A neural network waveform model/network (note model/network indicates model and network interchangeably) may be trained to bias its waveform representation towards a standard compliant baseline, while being further optimized for achieving an additional target objective. However, one of the main trade-offs that comes with moving to a learned waveform representation is the loss of understanding of its general properties, which are well understood for classical signal processing techniques. Additionally, DSP algorithms have been highly optimized for efficiency for low size, weight, and power (SWAP) requirements.

DL models/networks are becoming larger in size by the day so getting the performance of a DL model/network without a high computation cost is also desirable.

What is needed is a system and method to transform an input signal to an alternative representation where modifications to the signal enhance unique characteristics of the signal before reconstructing it.

SUMMARY

An embodiment provides a Deep-Learning (DL) network system for representation and construction of input signals comprising an encoder stage configured to process input signals, the encoder stage comprising Dilated Convolutions (DC) and mapping of the input signals into a latent embedded representation, learning a set of features that encode the input signals, wherein learning feature representations maintain a sample size the same as the input signals; an encoding capturing a latent space representation of the input signals in a learned feature space; and a decoder stage mapping latent features back to constructed or reconstructed output signals of a same size as the input signals; whereby the constructed signal output has a same dimensionality and representation as the input signals providing an alternative representation of the input signal. Embodiments comprise a training procedure comprising training inputs; training targets; and at least one training loss function, whereby weights of the encoder stage and the decoder stage layer are updated. In other embodiments, the training data and the at least one loss function of the training procedure are jointly selected as a pair. In subsequent embodiments a number of layers of the DC layers of the encoder stage and their respective kernel size, dilation rate, and number of filters are selected in congruence with each other. For additional embodiments a number of fully-connected layers of the decoder stage and associated activation functions are selected in congruence with each other. In another embodiment, the encoder stage comprises six signal dilated causal convolutions (SDCC) layers comprising four residual connection layers and four skip connection layers. For a following embodiment the encoder stage comprises six Signal Dilated Causal Convolutions (SDCC) layers comprising, from input to output, dilation rate, kernel size, and number of filters parameters of (1, 2, NF), (2, 4, 50), (8, 4, 50), (32, 4, 50), (128, 4, 50), and (362, 4, 50). In subsequent embodiments latent feature maps are learned from an unsupervised signal construction task and then transferred into other supervised tasks as a base feature extraction of the network. In additional embodiments the encoder is trained and then transferred to be used for other applications; and wherein the system is trained with a loss function that produces gradients to determine how to update the network. In included embodiments a trained encoder is used for supervised learning tasks with the decoder being replaced by classification layers; and wherein the system is trained with a loss function to minimize a difference between a signal produced by the decoder and a target training signal and a resulting output of a loss function is used to determine how to update the network. In yet further embodiments classification layers for RF fingerprinting are added to a trained encoder. In related embodiments the encoder stage comprises Signal Dilated Causal Convolutions (SDCC) layers plus a REctified Linear activation function (ReLU) and Batch Normalization (BN); and the decoder stage comprises a set of Dense, fully-connected, layers plus a REctified Linear activation function (ReLU) to map from a latent feature map space to an output signal. For further embodiments a mathematical definition of the SDCC layers is given by $z_i=\tan h(W_{f,i}*x_i)\odot\sigma(W_{g,i}*x_i)$ where $z_i$ is an output, $x_i$ is a layer input, which maintains input RF signal shape, i indexes over layer input, $W_f$ and $W_{g,i}$ are learnable filter weights, $*$ is an SDCC convolution operation, $\odot$ is an element-wise multiplication operation, and a is a sigmoid function.

Another embodiment provides a method for representation and construction of signals through deep-learning comprising inputting a digital signal; receiving the digital signal in an encoder stage, wherein a set of Signal Dilated Causal Convolutions (SDCC) layers extract features from the digital input signal into a latent feature map space, wherein learning feature representations maintain a same sample size as the input; receiving, in a decoder stage; output from the encoder stage; and outputting the construction of the input signal; wherein modifications to latent representations of the input signal are performed to alter the constructed signal; and whereby the constructed signal output has a same dimensionality and representation as the input signal. In ensuing embodiments the input digital signal is a digital Radio Frequency (RF) Wi-Fi 802.11a/g waveform. For yet further embodiments, the encoder stage comprises feature maps, each the feature map comprising a latent representation having a same shape and dimensionality of the input signal due to a Signal Dilated Causal Convolutions (SDCC) operation. For more embodiments, the modifications are done to a latent signal representation at the encoding stage; and the modifications are done independently to feature map representations. Continued embodiments include latent feature maps of the latent feature map space comprise mapping of input frequency to feature map frequency; and mapping variations at a specific time in input map to same time locality in feature maps. For additional embodiments, latent feature maps of the latent feature map space encode variation in either I or Q but not both; and invariance to turning off I or Q input.

A yet further embodiment provides a non-transitory computer readable medium, having stored thereon, instructions that, when executed by a computing device, cause the computing device to perform a representation and reconstruction of digital input signals method comprising receiving the digital input signal in an encoder stage, wherein a set of Signal Dilated Causal Convolutions (SDCC) layers extract features from the digital input signal into a latent feature map space, wherein learning feature representations maintain a same sample size as the input; receiving, in a decoder stage; output from the encoder stage; and outputting the reconstruction of the input signal from the decoder stage; whereby the reconstructed signal output has a same dimensionality and representation as the input signals.

BRIEF DESCRIPTION OF THE DRAWINGS

FIG. 9 depicts a method flowchart configured in accordance with an embodiment.

Figure 1:
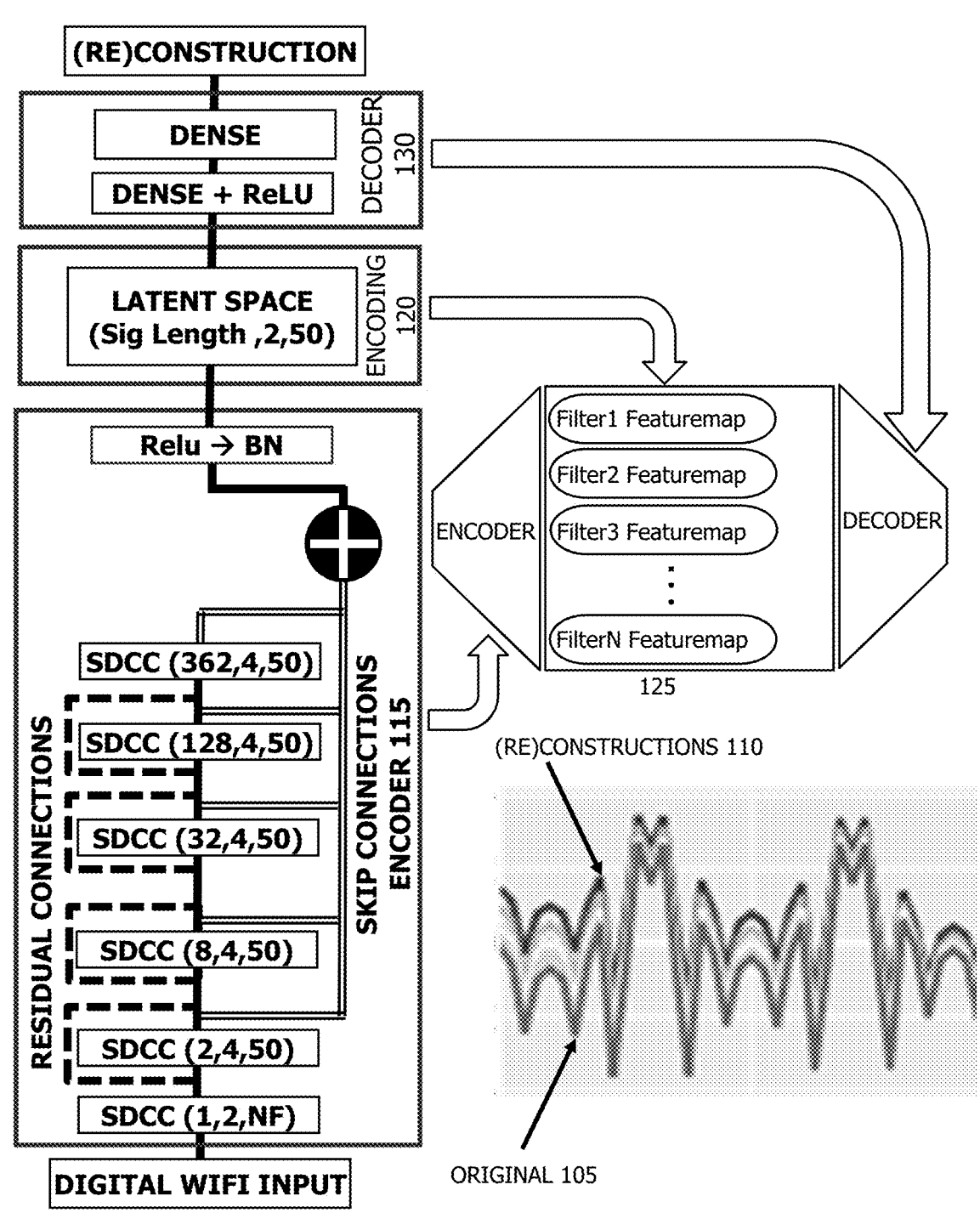
FIG. 1 depicts a Signal (Re)construction Dilated Casual Convolutions (SR-DCC) network and how it embeds an input signal into an alternative representation, i.e., latent space feature maps, and then how it (re)constructs from the learned feature maps back to an output signal configured in accordance with an embodiment.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

DEFINITIONS The following definitions have the common meaning as understood by a person of ordinary skill in neural network design and implementation. Causal padding is equivalent to padding inputs with the correct amount of zeros on the left and using valid padding; it ensures that the convolutional layer does not look into the future when making predictions. Classification layers compute the cross-entropy loss/probability for classification and weighted classification tasks with mutually exclusive classes (for example, to specify the number of classes K of the network, include a fully connected layer with output size K and a softmax layer before the classification layer). Congruence is the correlation between, for example, input and output. Featuremaps relates to a function computed by the convolutional layer or the activation of the hidden neurons output from the layer. Fully-connected layers in neural networks are those layers where all the inputs from one layer are connected to every activation unit of the next layer. Kernel is a method of using a linear classifier to solve a non-linear problem, applied on each data instance to map the original non-linear observations into a higher-dimensional space in which they become separable. Loss Functions are a method to calculate the error of a neural net. Loss Function Gradients are calculated by loss functions and are used to update the weights of a neural net. Mapping uses unsupervised learning to produce a low-dimensional (typically two-dimensional), discretized representation of the input space of the training samples, denoted as a map. A Residual block is implemented when the activation of a layer is fast-forwarded to a deeper layer in the neural network. Dilated causal convolutions are a type of convolution that "inflate" the kernel by inserting holes between the kernel elements; an additional parameter (dilation rate) indicates how much the kernel is widened. In Supervised learning, the desired output is already known; while learning, one of the input patterns is given to the net's input layer. Transfer learning generally refers to a process where a model trained on one problem is used in some way on a second related problem; in deep learning, transfer learning is a technique whereby a neural network model is first trained on a problem similar to the problem that is being solved. Training Target is the "correct" or desired value for the response associated with an input; usually, this value will be compared with the output (the response of the neural network) to guide the learning process involving the weight changes. In Unsupervised learning there are no target outputs; it cannot be determined what the result of the learning process will look like.

Within the radio frequency domain, embodiments have wide applications to waveform synthesis (i.e. (re) construction), waveform compression, waveform representation, feature extraction, cryptography, and more. Embodiments have applications to other time-series data sources. Particularly, the neural network architecture design is parameterized to flex and adapt to various embodiments including RF fingerprint enhancement, interference removal, and intelligent beam forming. In embodiments, the encoder's parameters that vary between embodiments comprise the number of DC layers, the number of filters to use per layer, the kernel sizes per layer, and the dilation rate per layer. Decoder parameters that vary between embodiments comprise the number of fully connected (i.e. Dense) layers and the activation functions used. Another component that can vary between embodiments is the training procedure which encompasses training data (inputs and targets) and loss function.

In general, embodiments decompose a signal into an alternative representation and "construct" a different form of the signal. Other embodiments decompose a signal into an alternative representation and reconstruct it from that representation back into its original form. (Re)construction is a specific embodiment of the method. The step of moving the signal to an alternative representation has a number of properties that are used and exploited in signal processing, signal understanding, encoding/decoding, environment mitigation, etc. Embodiments use a novel, machine-learning-based technique to generate the alternative representation, demonstrating a new way to tackle problems that traditionally use functional decomposition. Embodiments demonstrate taking a communications signal to an alternative representation where modifications to the signal enhance unique characteristics of the signal before reconstructing it. As mentioned, "reconstruction" is an embodiment of signal "construction".

In embodiments, a training procedure is used to constrain the signal construction model/network and associated latent embeddings of a signal. Some embodiments use "unsupervised", "supervised", or "semi-supervised" training procedures. It performs a form of deep activity gated non-linear signal decomposition. This results in a latent space encoding of "feature maps" that each are of the same size as the input and differentially encode information about the signal. This is similar to basis functions, but here the representation is latent, learned, and activity based. This results in a deep learning model that can perform waveform synthesis from a latent space.

Embodiments use deep learning to create "learned feature maps" that are dependent on the input signal. A neural network is trained that takes a signal as input and outputs a reproduction of the signal. The learned feature maps are intermediate layers of this network. In particular instantiations, inputs to the neural network are transformed into the learned feature maps through dilated causal convolution layers (DCC). The feature maps are transformed to the outputs through additional neural network layers that may be chosen on a case-by-case basis. The feature maps are designed to have the same number of samples (e.g. time samples) and channels (e.g. in-phase and quadrature) as the input, and so the feature maps may be interpreted as signals representing salient features of the original signal. Below are comments on the analogy between learned feature maps and basis functions in traditional functional decompositions like Fourier transforms. The learned feature maps are constructed from data-driven learning of the relevant training data, in contrast to other expert-engineered approaches discussed below. These feature maps form a rich space in which various properties of input signals may be altered into novel output signals by altering the feature maps. In practice, operation within this space is made by making modifications to learned feature maps to alter aspects of RF signals with the goal of increasing the unique signature imparted on the signal from an RF front end. In instantiations, the feature maps are transformed into outputs (which are replicas of the original input) by a series of fully connected layers. Embodiments are similar in design to an autoencoder. But where an autoencoder has an embedding space of smaller dimension than the input, embodiments are embedding into a space with larger dimension than the input, since each feature map that forms the embedded space matches the dimensionality of the input. Thus embodiments decompose the original signal into many auxiliary signals that maintain the time representation of the original signal.

Embodiments are better than prior approaches in that they allow the system to learn preferred "basis functions" ("learned feature maps") directly from the data while also permitting non-linear combinations of the learned feature maps. These two points in tandem provide more flexibility in representing and reconstructing the signal beyond simply learning linear combinations of basis functions or learning a compressed encoding. The feature maps unveil many new properties and potential manipulations of signals that may have novel applications in electronic warfare, waveform synthesis, cryptography, communications, signals intelligence, radar, etc. By not compressing to a smaller encoding, this method also combats information loss better than compression techniques. The fact that the learned feature maps may be interpreted as signals also makes it possible to leverage signals processing expertise to understand and alter what the neural network is doing internally; such an approach is currently untenable with the standard "black box" approach of most machine learning, as in a typical autoencoder. Embodiments approach this problem from a signal processing (communications) perspective by designing learned feature maps that are interpretable as signals.

This generalizes to a new area for artificial intelligence, and this method is applicable for any domain that currently utilizes functional decomposition methods like Fourier transforms. As such, there are many additional novel applications to other data and domains. Previous work is described in U.S. patent application Ser. No. 17/142,800 "ARTIFICIAL INTELLIGENCE RADIO CLASSIFIER AND IDENTIFIER" is incorporated, by reference, in its entirety, for all purposes. Similarly, as mentioned, U.S. patent application Ser. No. 16/539,578 RF FINGERPRINT ENHANCEMENT BY MANIPULATION OF AN ABSTRACTED DIGITAL SIGNAL filed Aug. 13, 2019 is incorporated, by reference, in its entirety, for all purposes.

Other methods have fixed basis functions which may be desirable based on their useful mathematical properties. These properties are agnostic to application and thus broadly applicable, but their representations are not necessarily optimal for a specific task/application or set of tasks/applications. Embodiments' methods are both more general and adaptable. They are more general in that they can learn many types of data transforms and their associated representations, including the fixed transformations of existing methods. This adaptability allows transformations and associated representations to be learned which are optimal for achieving a specific task/application or set of tasks/applications. The adaptability is two-fold. Selecting the training data and loss functions specifies the targeted types of transformations and representations. Once the algorithm is trained, outputs of the system can be further adapted by modifying the latent activations or feature maps. Adaptability is centered in 1) how training data and loss functions are chosen and 2) how latent representations of input data are modified.

In described embodiments, Wi-Fi communication signals were chosen as a target application and the system was trained to be particularly well adapted at representing Wi-Fi waveforms. This is adaptability 1) at play. Then the Wi-Fi waveforms were modified to enhance a transmitter's RF Fingerprint by modifying their latent representations. This is adaptability 2) at play.

Embodiments of the system can be applied to many other embodiments besides Wi-Fi signals and RF Fingerprint enhancement. For example, Radar systems and electronic warfare applications. In that case, the training data and loss functions would change and a new transform and associated representation would be developed. This transform could then be used to further modify the input Radar IQ data to enhance or perform some electronic warfare task such as anti-jamming interference removal, etc.

Embodiments have the same functionality as a 1D dilated causal convolution layer in terms of causal padding and dilation rate, but are expanded out to 2 dimensions to cover both the in-phase and quadrature input signal channels. Feature maps are collections of 2D columns, where shape= (sequence length, 2, num. filters). This clearly visualizes what the filters are learning, because each filter's activations maintain the representation of the input signal, i.e., shape= (sequence length, 2). Convolutions do not implement complex arithmetic. In order to keep the model/network complexity the same as the original DCC model/network, embodiments use half the number of filters per DCC layer. For example, if the original DCC model used 100 filters per residual block, 50 filters per residual block are used for the sig dcc layer implementation.

FIG. 1 depicts the general concept of the Signal (Re) construction Dilated Casual Convolutions (SR-DCC) network that performs decomposition and reconstruction 100. The original signal input 105 is passed into the network in a 2 channel representation, in embodiments, for in-phase and quadrature, or IQ, components, and (re)constructions 110 output. Latent feature maps are learned and provide embedded representations for each signal 120. In embodiments, some filters learn high frequency information; other filters learn lower frequency information. This provides flexible space for modifying device signals.

Signal (Re)construction (SR)-DCC model/network latent representations can be altered to modify (re)constructed signals. Filter feature maps are learned signal representations. This provides flexible latent space for modifying device signals for RF fingerprint enhancement or other signal alteration functions. Embodiments include Latent features after going through Signal DCC (SDCC) layers (Activity Gated), dependent upon input signal representation. Embodiments include modifications that can enhance, or suppress IQ Sensitivity and learn to produce feature maps with variation in either I or Q but not both. Embodiments exhibit input IQ Invariance: Invariant to turning off I or Q input. Embodiments exhibit Time Locality Mapping, they learn time locality mapping from the input signal to encoded feature maps (i.e. variations happening at a specific time in input map to same time locality in feature maps). Embodiments also exhibit Input Frequency Preservation: Strong mapping of input frequency to feature map frequency.

In this example, the original signal 105 is a digital WiFi input and is an input to the Encoder 115. The Encoder 115 contains a number of SDCC layers that allow for residual connections to be employed and scaled accordingly. Skip Connections of Encoder 115 provide an alternative path for the gradient (with backpropagation). The additional paths are often beneficial for convergence. Skip Connections in deep architectures skip some layer in the neural network, and feed the output of one layer to layers later in the network. This allows for features to be combined from different sized receptive fields, enabling empirical control of the receptive field size for any given input. Residual Connections allow gradients to flow through a network directly, without passing through non-linear activation functions. Non-linear activation functions, by nature being non-linear, can cause the gradients to explode or vanish (depending on the weights). These residual connections allow for layers to learn feature differences instead of only learning features from its input, i.e., it enables learning additional information from a larger receptive field (later in the network) that was not already learned from a smaller receptive field (earlier in the network). Therefore, residual connections help improve convergence and extract more subtle features. Further details of encoding and decoding follow, and are provided with FIG. 6.

More specifically, Encoder 115 embeds a raw IQ signal into a latent space representation 120 (Latent Space Encoding). Latent Space Encoding 120 refers to a discrete location in the network, as opposed to an encoder network itself. "Encoding" depicts the more static nature of this element. In embodiments, this is the location referred to as the latent representation, where feature representations of the signal (from the encoder, 115) have been extracted and then mapped back from these feature representations to a signal through decoder 130. In Encoder 115, receptive fields in the various layers of the Encoder scale exponentially, enabling patterns to be learned at a variety of scales. This starts with feature extraction from Signal DCC (SDCC) layers.

The mathematical definition of the SDCC is given by:

$$z_i = \tan h(W_{f,i} * x_i) \odot \sigma(W_{g,i} * x_i) \qquad \text{Eq. (1)}$$

where $x_i$ is the input to block i, $W_{f,i}$ is the filter kernel for block i, $W_{g,i}$ is the gate kernel for block i, * is the convolution operation, ⊙ is the element wise multiplication operation, and $\sigma(z)$ is the sigmoid function. The output of the SDCC operation is then passed through a causal convolution with kernel size of one, which is then summed with the residual connection and fed into the next residual block. This determines the specifics of the feature extraction for each layer. The term residual block has the common meaning understood by a person of ordinary skill in neural network design and implementation.

The output of the encoding stage 115 is fed to the latent space encoding section 120. On the right side is an exploded view showing the three stages for the Encoder 115—Latent Space Encoding 120—and Decoder 130, along with the Filter Featuremaps 125 for Latent Space Encoding 120.

The Latent Space Encoding 120 includes Latent feature maps 125 of encoding 120, providing a set of feature map encodings that represent the signal—Deep activity gated base functions with non-linear functional decomposition. The Featuremaps section comprises an autoencoder-like structure to reconstruct the time-domain signal, performing waveform synthesis, but in an expanded space more similar to basis functions. The latent space has more dimensions than (re)construction space, facilitating low-error in (re) construction. However, each feature map has the same size as the input signal. In this embodiment, latent space is defined by (Sig Length, 2, 50) where the first number is the length of the signal (hence the same size as the signal), the 2 represents the I&Q channels (similar to representation of the signal itself), and the 50 represents the (configurable) number of feature maps. Therefore, N=50, and Latent Feature Maps 125 is displaying 50 feature maps.

The latent representation output from the Latent Space Encoder section is an input to the Decoder section 130. Decoder 130 constructs the target signal from the latent representation. This returns the signal to its original representation from the latent embedded space, which should align with 105 with negligible error. In the general embodiment, case network parameters are learned by minimizing the loss function or set of loss functions. (Re)construction error is a loss function for a specific embodiment. In some embodiments learning the network parameters is done through minimizing (re)construction error.

Figure 2:
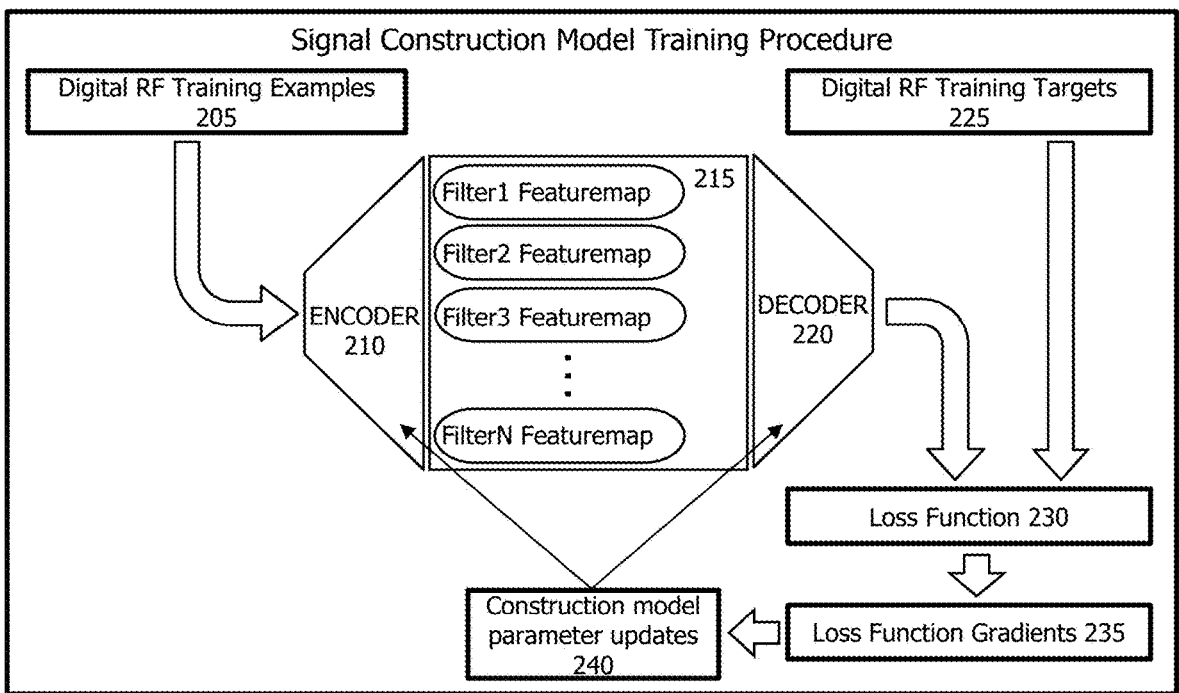
FIG. 2 depicts a signal construction and model training procedure configured in accordance with an embodiment.
Figure 3:
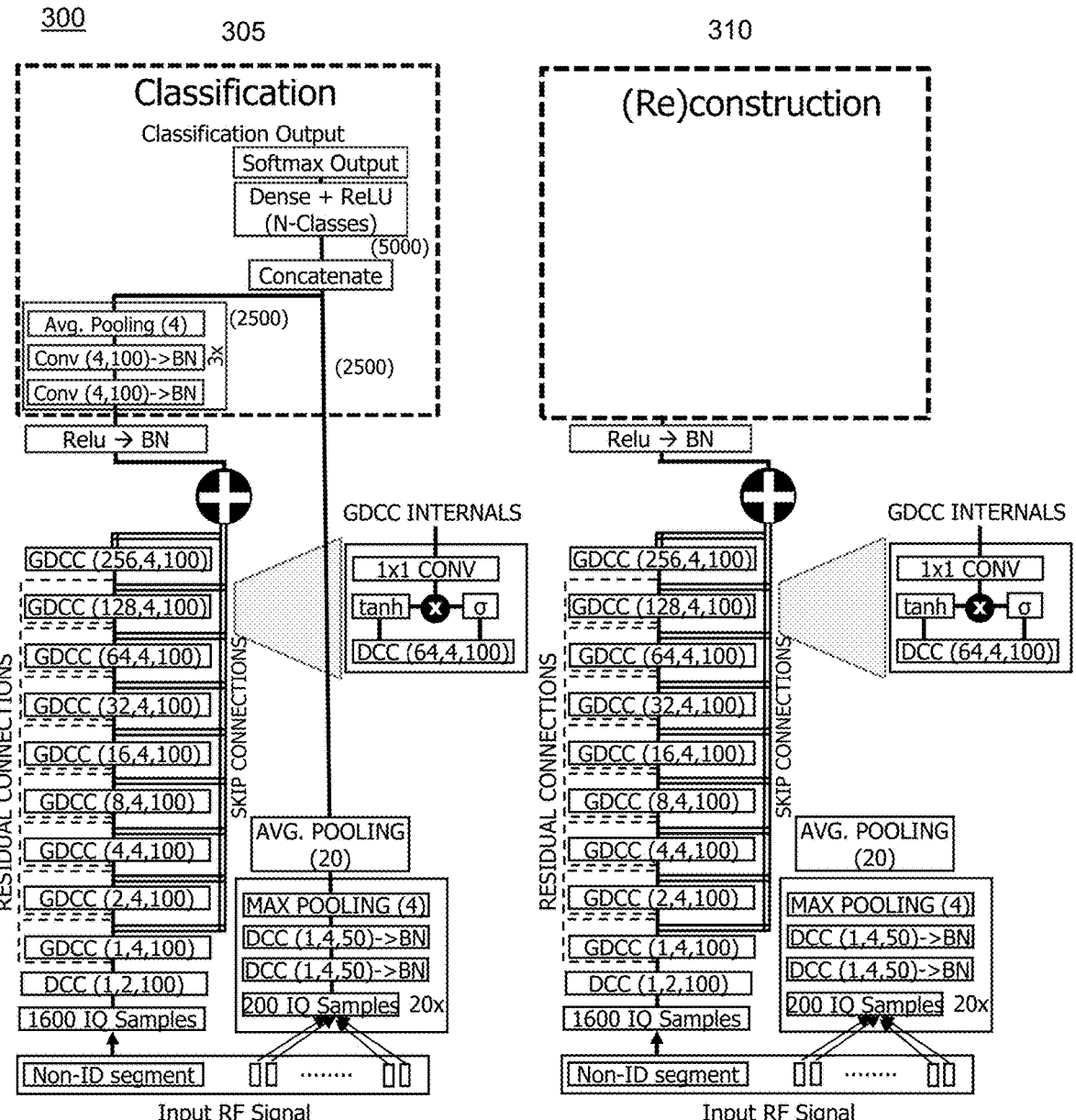
FIG. 3 depicts DCC classifier used as base model/network for SR-DCC waveform synthesis configured in accordance with an embodiment.

The learned encodings are not only relevant for (re) construction tasks, but also for other applications as well. This includes classification tasks. In embodiments, the (re) construction layers of the network are removed and replaced with classification layers. Classification layers comprise a softmax classifier to obtain the output classification probabilities as known to a person of ordinary skill in the art of neural network design and implementation for RF fingerprinting and modulation recognition, amongst other tasks. This is depicted in FIG. 3. This shows that the latent feature maps can be learned from a unsupervised signal (re)construction task and then transferred into other supervised tasks as the base feature extraction of the network FIG. 2 depicts a signal construction and model/network training procedure 200. Digital RF Training Examples 205 are entered into Encoder 210. Encoder 210 produces Featuremaps 215 designated as Filter1 Featuremap through FilterN Featuremap. Loss function 230 compares Decoder 220 output with Digital RF Training Targets 225. Digital RF Training Target 225 examples comprise the desired reconstruction pairs for the RF training examples. Loss Function Gradients 235 are determined from Loss Function 230. Loss Function Gradients 235 instruct how to perform Construction model parameter updates 240 input to Encoder 210 and Decoder 220. Training Examples, Featuremaps, Loss Functions, Loss Function Gradients, and Training Target have the common meaning understood by a person of ordinary skill in neural network design and implementation. In embodiments, latent feature maps are learned from an unsupervised signal construction task as understood by a person of ordinary skill in the art, such as reconstruction mean squared error. These can be transferred into other supervised tasks as a base feature extraction of said network, through the use of transfer learning and other means as understood by a person of ordinary skill in the art.

FIG. 3 depicts the DCC classifier used as a base model/ network for SR-DCC waveform synthesis 300. The dilated causal convolutional architecture can output class probabilities vectors for supervised learning tasks, e.g., RF fingerprinting or modulation classification 305. Embodiments then use the feature extraction part of the network, the bottom part of architecture below the dashed line, as the basis for extracting features for (Re)construction 310. The (re)construction network is trained for signal (re)construction error versus classification error. Operation follows that of FIG. 1. This illustrates the generalizability of the approach and the ability of the feature extraction part of the network to apply to both classification and (re)construction tasks. Further, the feature extraction part of the network can be trained in one network construct and then utilized in another, such as through transfer learning.

In one example, a digital Wi-Fi Dataset was generated using Matlab's WLAN toolbox to train the (re)construction network. Embodiments fix signal length to 1600 IQ samples produced at 20 Msamps/s. PSDU bits and modulation type were varied. 802.11a/g WiFi uses 8 different modulation coding schemes: ½ rate BPSK; ¾ rate BPSK; ½ rate QPSK; ¾ rate QPSK; ½ rate 16QAM; ¾ rate 16QAM; ⅔ rate 64QAM; ¾ rate 64QAM. In embodiments, the dataset contains 10,000 signals for each modulation class.

Figure 4:
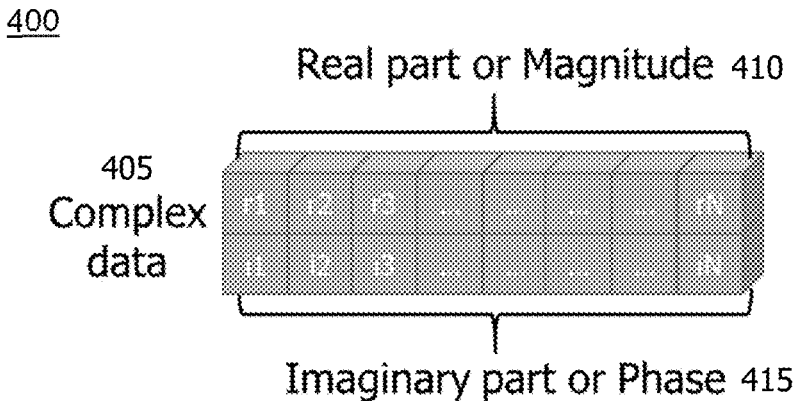
FIG. 4 depicts a DCC Operation producing 1D feature map configured in accordance with an embodiment.
Figure 4:
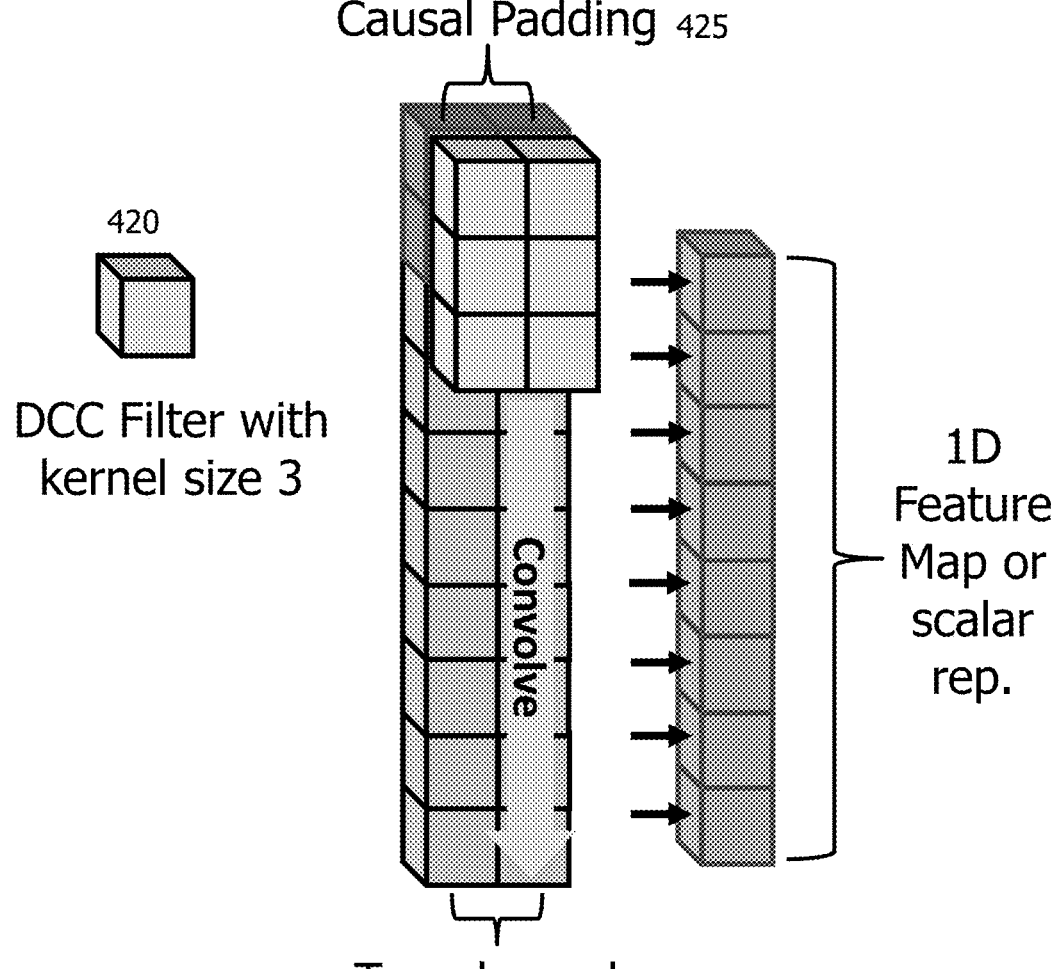

FIG. 4 depicts a DCC Operation producing 1D feature map 400 comprising complex data comprising a real and imaginary input signal, or, conversely, a magnitude and phase representation. Complex-valued input data 405 is passed into the network in two channels, real part or magnitude 410 and imaginary part or phase 415. This representation is then mapped into a 1D feature representation, where the mapping is learned through the training process. Each element of the feature representation is a contribution of several elements from the input channels, referred to as a kernel. In embodiments, the filter kernel 420 size is three (as illustrated in the left of the figure). Causal padding 425 needs to be added to the input channels to allow for the kernel to process the ends of the signal. Causal padding, mapping, kernel, and training have the common meanings as understood by a person of ordinary skill in neural network design and implementation.

Figure 5:
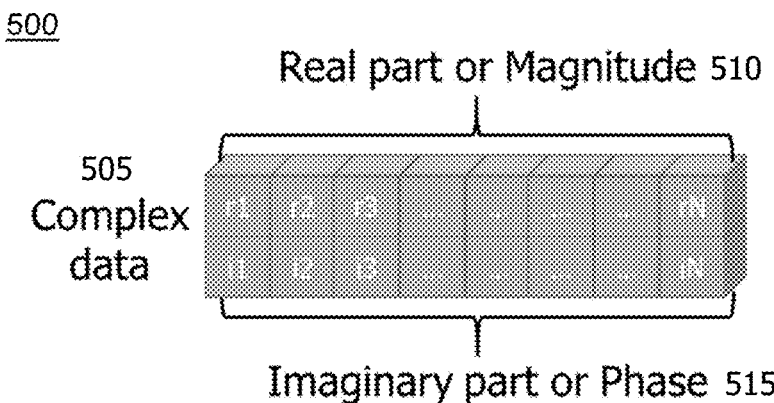
FIG. 5 depicts a Signal DCC operation producing 2D feature map configured in accordance with an embodiment.
Figure 5:
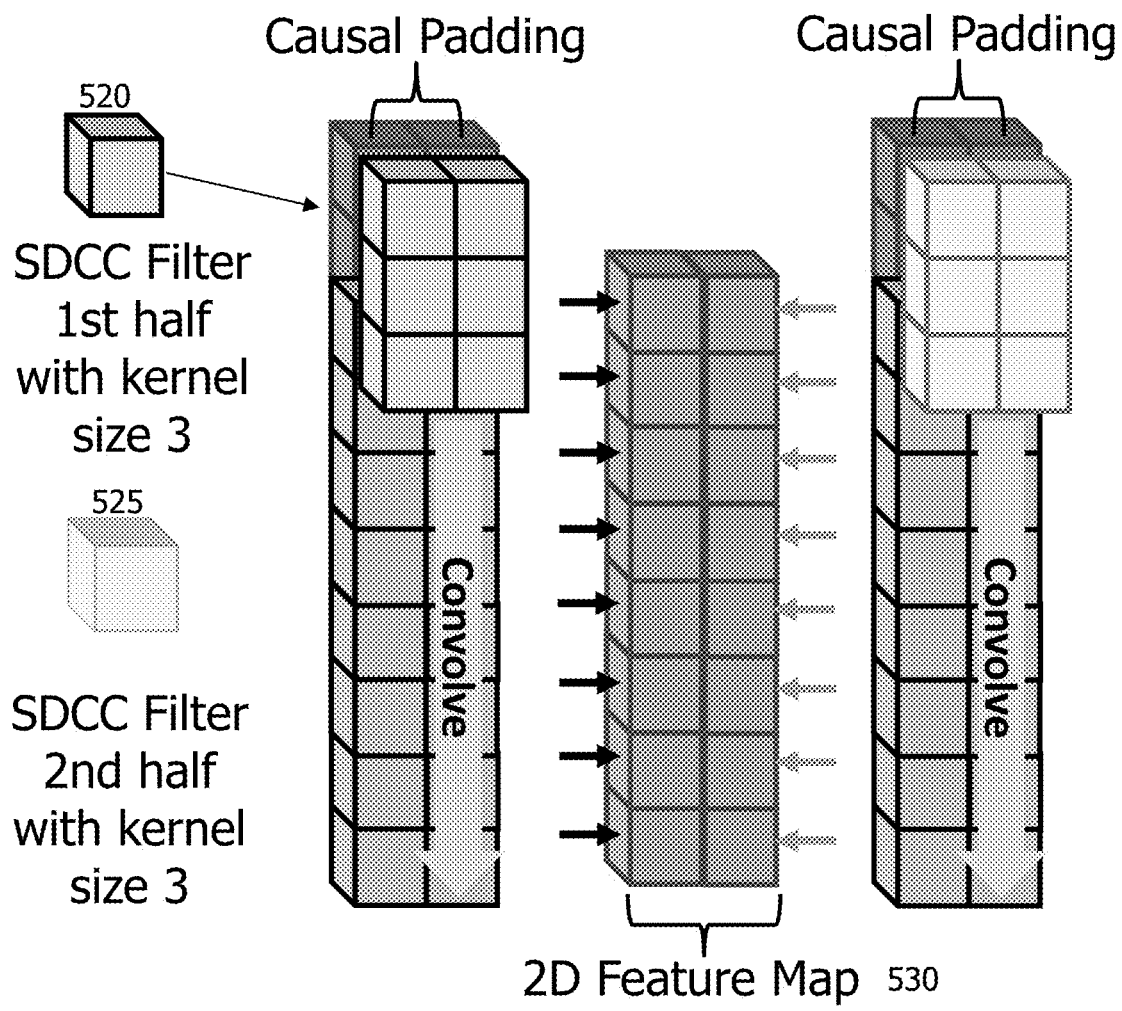

FIG. 5 depicts a Signal DCC (SDCC) operation producing 2D feature map 500 comprising complex data comprising a real and imaginary input signal, or, conversely, a magnitude and phase representation. Complex-valued input data 505 is passed into the network in two channels, real part or magnitude 510 and imaginary part or phase 515. In this instantiation, instead of mapping to a feature representation that is a single channel, the network maps to a feature representation that has the same channel size as the input, two in this case, 520 and 525. This allows for maintaining the same size representation as the input for analysis of what the network is learning internally through easy visualization of the feature maps as if they were the input signal themselves, i.e., a 2 channel signal representation. The first half 520 and second half 525 of the filter are convolved over the same input data. The first half and second half of the filter each output their own column in the 2D feature map 530.

Figure 6:
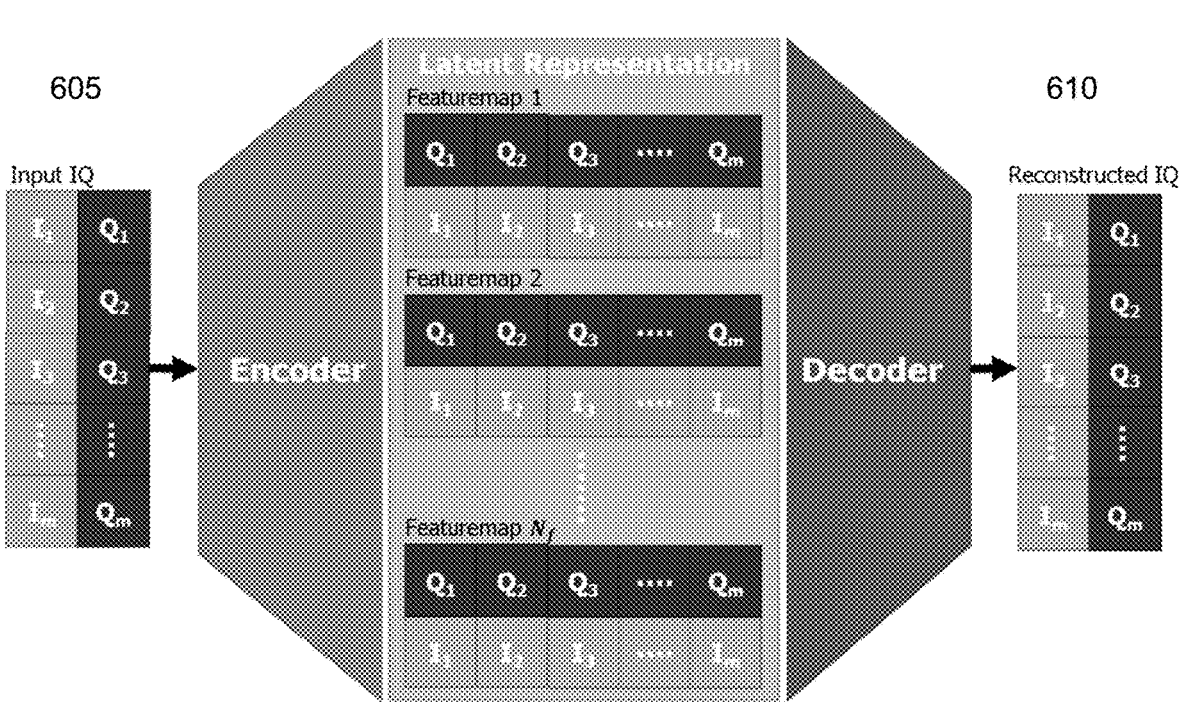
FIG. 6 depicts a 2 channel Signal DCC (SDCC) Convolution Operation configured in accordance with an embodiment.

FIG. 6 depicts a 2 channel Signal DCC (SDCC) Convolution Operation Construction Model 600. It shows the structure of the Featuremaps 125, 215 of FIGS. 1 and 2. It includes 2D inputs 605/outputs 610, and 2D feature maps 615. This illustrates that the inputs 605 and outputs 610 are 2D Sequences of I and Q and the latent feature maps 615 are also 2D sequences which can be interpreted as I and Q values. All representations also maintain the same temporal length, m, in 605, 610, and 615.

Figure 7:
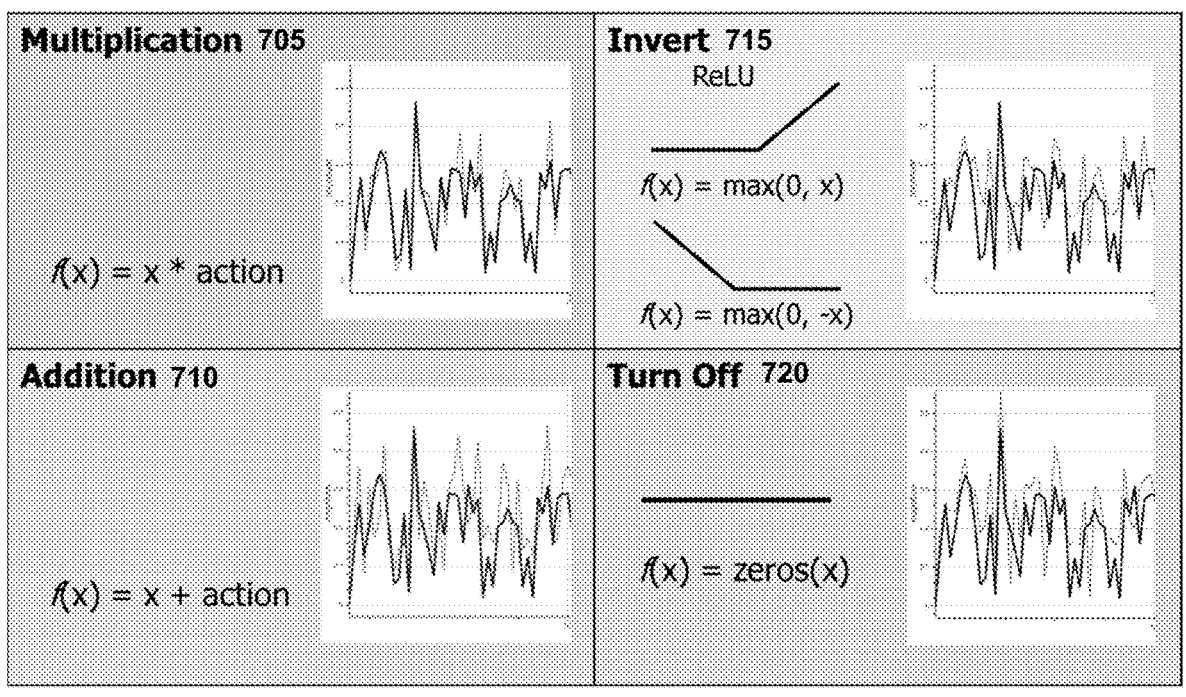
FIG. 7 depicts dimension-wise operators for making optional feature map modifications configured in accordance with an embodiment.

FIG. 7 depicts embodiment options for dimension-wise feature map optional modifications 700. Action application methods include Multiplication 705; Addition 710; Inversion 715; and Turn Off 720. Multiplication 705 is depicted by f(x)=x*action. Addition 710 is depicted by f(x)=x+action. Inversion 715 is depicted by ReLU f(x)=max(0, x) and f(x)=max(0, −x). Turning Off 720 is depicted by f(x)=zeros(x). These modifications are optionally applied to the latent representations 615 of FIG. 6.

Figure 8:
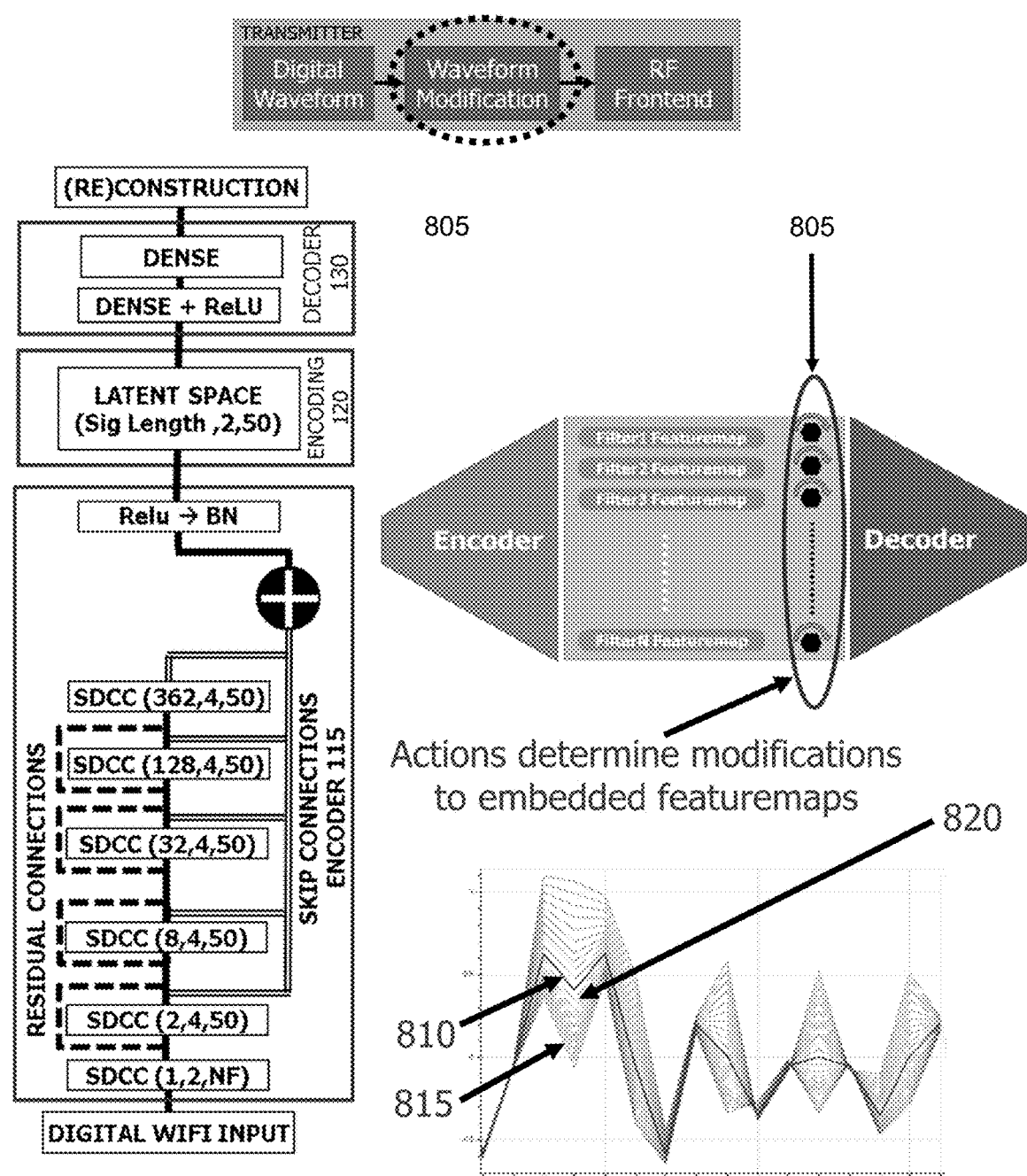
FIG. 8 depicts a model for modifications applied to dimensional representation within Signal (Re)construction Dilated Casual Convolutions (SR-DCC) configured in accordance with an embodiment.

FIG. 8 depicts a model/network for modifications applied to dimensional representation within Signal (Re)construction Dilated Casual Convolutions (SR-DCC) 800. Waveform synthesis in latent space perturbs latent feature maps to generate a modified reconstructed RF signal. Modified (re)construction slightly alters the digital signal going into the RF frontend. The RF frontend typically comprises the antenna, filters, amplifiers and mixers that process the analog input signal and condition to appropriate form for A/D conversion and subsequent digital processing. Modifications excite hardware differently, and are specific per device. Each feature map can be modified by altering how much weight it contributes to the (re)construction, as depicted with turn knobs 805, for intuitive understanding. "Knob rotation" represents the weight applied to each Featuremap, from zero to maximum. In one embodiment the goal is to synthesize modification to uniquely alter the device's fingerprint. Example modifications preserve communications 810, and break communications 815, or a valid modified (re)construction in that it maintains communications and increases fingerprint accuracy 820. External control (autonomous or human operated) can control the modifications to embedded featuremaps for specific objectives (in embodiments enhancing an RF fingerprint); adapting feature maps modifies synthesized signal. Latent feature maps are adaptive to enable custom waveform synthesis. This allows for subtle modifications that preserve communications, have low-error (re)constructions, enhance RF fingerprints, and are difficult for adversaries to mimic or understand.

FIG. 9 depicts a method flowchart 900. Steps comprise inputting a digital signal 905 such as the Wi-Fi digital input. The digital signal is then processed by an SDCC encoder stage 910, as shown in FIG. 1 (115) and FIG. 2, wherein a set of Signal Dilated Causal Convolutions (SDCC) layers extract features from the digital input signal into a latent feature map encoding space 915. The Latent feature map encoding space is shown in FIG. 1 (120), FIG. 2, and FIG. 6 (615) and is a representation and location in the network comprising a latent space representation of the signal. Processing, in an optional modification stage 920, depicted in FIG. 7, applied to FIG. 6 (615), output from the Latent feature map encoding space, wherein the modification stage slightly alters the latent representation of the signal.

Processing, in a decoder stage 925, the output from the Latent feature map encoding space or the optional modification stage in a (re)construction stage 930 that is depicted in FIG. 1 and FIG. 6.

Outputting, from the (re)construction stage 930 the (re)construction of the input signal 935 that represents a near representation of the original signal or a modified version of the original signal with additional desired artifacts added to the signal. Examples of reconstructed output application include Wi-Fi signal RF Fingerprint enhancement, modulation recognition, interference removal, intelligent beam forming, radar systems, and electronic warfare applications.

The computing system used for the Deep-Learning (DL) system for representation and (re)construction of input signals for performing (or controlling) the operations or functions described hereinabove with respect to the system and/or the method may include a processor, FPGA, I/O devices, a memory system, and a network adaptor. The computing system includes a program module (not shown) for performing (or controlling) the operations or functions described hereinabove with respect to the system and/or the method according to exemplary embodiments. For example, the program module may include routines, programs, objects, components, logic, data structures, or the like, for performing particular tasks or implement particular abstract data types. The processor may execute instructions written in the program module to perform (or control) the operations or functions described hereinabove with respect to the system and/or the method. The program module may be programmed into the integrated circuits of the processor. In an exemplary embodiment, the program module may be stored in the memory system or in a remote computer system storage media.

The computing system may include a variety of computing system readable media. Such media may be any available media that is accessible by the computer system, and it may include both volatile and non-volatile media, removable and non-removable media.

The memory system can include computer system readable media in the form of volatile memory, such as random access memory (RAM) and/or cache memory or others. The computer system may further include other removable/non-removable, volatile/non-volatile computer system storage media. The computer system can communicate with one or more devices using the network adapter. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A Deep-Learning (DL) network system for representation and construction of input signals comprising:

an encoder stage configured to process input signals, said encoder stage comprising Dilated Convolutions (DC) and mapping of the input signals into a latent embedded representation, learning a set of features that encode said input signals, wherein learning feature representations maintain a sample size the same as said input signals;

an encoding capturing a latent space representation of said input signals in a learned feature space; and a decoder stage mapping latent features back to constructed or reconstructed output signals of a same size as said input signals;

whereby said constructed signal output has a same dimensionality and representation as said input signals providing an alternative representation of said input signal.

2. The system of claim 1 comprising:

a training procedure comprising:

training inputs;

training targets; and at least one training loss function, whereby weights of said encoder stage and said decoder stage layer are updated.

3. The system of claim 1, wherein said encoder stage comprises six signal dilated causal convolutions (SDCC) layers comprising four residual connection layers and four skip connection layers.

4. The system of claim 1, wherein said encoder stage comprises six Signal Dilated Causal Convolutions (SDCC) layers comprising, from input to output, dilation rate, kernel size, and number of filters parameters of (1, 2, NF), (2, 4, 50), (8, 4, 50), (32, 4, 50), (128, 4, 50), and (362, 4, 50).

5. The system of claim 1, wherein latent feature maps are learned from an unsupervised signal construction task and then transferred into other supervised tasks as a base feature extraction of said network.

6. The system of claim 1, wherein said encoder is trained and then transferred to be used for other applications; and wherein said system is trained with a loss function that produces gradients to determine how to update said network.

7. The system of claim 1, wherein a trained encoder is used for supervised learning tasks with the decoder being replaced by classification layers; and wherein said system is trained with a loss function to minimize a difference between a signal produced by said decoder and a target training signal and a resulting output of a loss function is used to determine how to update said network.

8. The system of claim 1, wherein said encoder stage comprises Signal Dilated Causal Convolutions (SDCC) layers plus a REctified Linear activation function (ReLU) and Batch Normalization (BN); and said decoder stage comprises a set of Dense, fully-connected, layers plus a REctified Linear activation function (ReLU) to map from a latent feature map space to an output signal.

9. A non-transitory computer readable medium, having stored thereon, instructions that, when executed by a computing device, cause the computing device to perform a representation and reconstruction of digital input signals method comprising:

receiving said digital input signal in an encoder stage, wherein a set of Signal Dilated Causal Convolutions (SDCC) layers extract features from said digital input signal into a latent feature map space, wherein learning feature representations maintain a same sample size as the input;

receiving, in a decoder stage; output from said encoder stage; and outputting said reconstruction of said input signal from said decoder stage;

whereby said reconstructed signal output has a same dimensionality and representation as said input signals.

* * * * *